(12) United States Patent
Taicher

(10) Patent No.: US 6,559,640 B2
(45) Date of Patent: May 6, 2003

(54) NMR APPARATUS AND METHOD UTILIZING PULSED STATIC MAGNETIC FIELDS

(75) Inventor: Gersh Zvi Taicher, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/862,821

(22) Filed: May 22, 2001

(65) Prior Publication Data

US 2002/0175681 A1 Nov. 28, 2002

(51) Int. Cl.$^7$ ................................................ G01V 3/00
(52) U.S. Cl. ............................................ 324/303; 324/306
(58) Field of Search ................................. 324/303, 306, 324/307, 312, 314, 318, 322

(56) References Cited

U.S. PATENT DOCUMENTS

| | | | |
|---|---|---|---|
| 3,667,035 A | * 5/1972 | Slichter | 324/303 |
| 4,521,734 A | 6/1985 | Macovski | 324/313 |
| 5,451,873 A | 9/1995 | Freedman et al. | 324/303 |
| 6,107,797 A | 8/2000 | Sezginer | 324/303 |
| 6,133,734 A | 10/2000 | McKeon | 324/303 |
| 6,133,735 A | 10/2000 | Hurlimann et al. | 324/303 |

FOREIGN PATENT DOCUMENTS

| | | |
|---|---|---|
| GB | 2330203 A | 4/1999 |
| GB | 2330203 B | 12/1999 |

OTHER PUBLICATIONS

P. T. Callaghan et al.; *Earth's Field NMR in Antarctica: A Pulsed Gradient Spin Echo NMR Study of Restricted Diffusion in Sea Ice*, Journal of Magnetic Resonance 133, Article No. MN981417, pp. 148–154, 1998.

Ales Mohoric et al.; *Self–Diffusion Imaging by Spin Echo in Earth's Magnetic Field*, Journal of Magnetic Resonance 136, Article ID jmre.1998.1594, pp. 22–26, 1999.

* cited by examiner

Primary Examiner—Louis Arana
(74) Attorney, Agent, or Firm—Madan, Mossman & Sriram, P.C.

(57) ABSTRACT

An apparatus and method for making NMR measurements uses an electromagnet for producing the static magnetic field. When used in well logging applications, the absence of a strong permanent magnet eliminates almost completely the amount of ferromagnetic debris picked up on the logging tool when passed through casing. The absence of debris results in the static magnetic field being substantially in conformance with design. The electromagnet is designed to give a static field of 0.6–6 mT (10–100 times the earth's magnetic field). Free induction decay or spin echo measurements may be made to give low resolution measurements of bulk properties of earth formations. The same coil configuration may be used to estimate body fat measurements of a human body. An alternate embodiment of the invention uses a capacitive discharge through an electromagnet with a time varying magnetic field with the receiver operating at a different frequency from the transmitter.

37 Claims, 3 Drawing Sheets

NMR APPARATUS AND METHOD UTILIZING PULSED STATIC MAGNETIC FIELDS

FIELD OF THE INVENTION

The invention is related to the field of Nuclear Magnetic Resonance (NMR) apparatus and methods. Specifically, the invention relates to NMR apparatus and methods using pulsed static magnetic fields.

BACKGROUND OF THE INVENTION

When hydrogen nuclei are placed in an applied static magnetic field, a small majority of spins are aligned with the applied field in the lower energy state, since the lower energy state in more stable than the higher energy state. The individual spins precess about the applied static magnetic field at a resonance frequency also termed as Larmor frequency. This frequency is characteristic to a particular nucleus and proportional to the applied static magnetic field. An alternating magnetic field at the resonance frequency in the Radio Frequency (RF) range, applied by a transmitting antenna to a subject or specimen in the static magnetic field flips nuclear spins from the lower energy state to the higher energy state. When the alternating field is turned off, the nuclei return to the equilibrium state with emission of energy at the same frequency as that of the stimulating alternating magnetic field. This RF energy is generating an oscillating voltage in a receiver antenna whose amplitude and electronic rate of decay depend on the physicochemical properties of the tissue and the magnetic environment of the nuclei. The applied RF field is designed to perturb the thermal equilibrium of the magnetized nuclear spins, and the time dependence of the emitted energy is determine by the manner in which this system of spins return to equilibrium magnetization. The return is characterized by two parameters: $T_1$, the longitudinal or spin-lattice relaxation time; and $T_2$, the transverse or spin-spin relaxation time.

There are at least two applications in which samples volumes are substantial and bulk material properties are of interest. One of these is logging of wells drilled for hydrocarbon recovery from earth formations and another is whole body fat determination.

Measurements NMR parameters of fluid filling the pore spaces of the earth formations such as relaxation times of the hydrogen spins, diffusion coefficient and/or the hydrogen density is the bases for NMR well logging. NMR well logging instruments can be used for determining properties of earth formations including the fractional volume of pore space and the fractional volume of mobile fluid filling the pore spaces of the earth formations.

Pulsed RF magnetic fields are imparted to the material under investigation to momentarily re-orient the nuclear magnetic spins of the hydrogen nuclei. RF signals are generated by the hydrogen nuclei as they spin about their axes due to precession of the spin axes. The amplitude, duration and spatial distribution of these RF signals are related to properties of the material under investigation. In the well logging environment, contrast is high between free and bound fluids based on their relaxation times, between oil and water based on their relaxation times and diffusion coefficient. In medical applications, tissue contrast is high between fat and muscle based on their relaxation times and can be further enhanced by application of certain RF sequences.

Methods of using NMR measurements for determining the fractional volume of pore space and the fractional volume of mobile fluid are described, for example, in *Spin Echo Magnetic Resonance Logging: Porosity and Free Fluid Index Determination*, M. N. Miller et al, Society of Petroleum Engineers paper no. 20561, Richardson, Tex., 1990. In porous media there is a significant difference in $T_1$ and $T_2$ relaxation time spectrum of fluids mixture filling the pore space. For example, light hydrocarbons and gas may have $T_1$ relaxation time of about several seconds, while $T_2$ may be three orders of magnitude smaller. This phenomenon is due to diffusion effects in the presence of gradients in the static magnetic field. The gradients may be external (from the applied static field) or internal. Internal magnetic field magnitude gradients are due to differences in magnetic susceptibility between the rock matrix of the formation and the fluids in the pores of the matrix.

Power requirements in NMR oil well logging have to be optimized for high efficiency operation. In order to perform a valid NMR experiment, a substance should be polarized for about 5 times the longest $T_1$ relaxation time, which is about 1 second long. Typical Carr-Purcell-Meiboom-Gill (CPMG) pulse sequences are about 0.5 to 1 second long. However, because of low signal-to-noise ratio (SNR), several repetitions of a CPMG sequence are required to bet an adequate SNR.

The earliest NMR logging instruments used the earth's magnetic field for providing the static field for NMR measurements. See, for example, U.S. Pat. No. 3,004,212 to Coolidge et al; U.S. Pat. No. 3,188,556 to Worthington; U.S. Pat. No. 3,538,429 to Baker; and U.S. Pat. No. 2,999,204 to Jones et al. The earth's magnetic field is approximately 60 $\mu$T at the poles with a Larmor frequency f for protons of approximately 2.5 kHz. The signal level per unit volume for an NMR survey is approximately proportional to $f^{7/4}$. The early NMR logging instruments suffered from the problem of low resolution because signals from a large volume of the earth were required to get an acceptable SNR. When the earth's magnetic field is used for the static field, there is no problem in having a uniform static field over a large region, so that SNR is not a major problem; however, there are many applications in which high resolution is required. This is difficult to achieve using the earth's magnetic field as the static field for NMR experiments.

In order to achieve high resolution, NMR devices used in recent years for well logging operations use permanent magnets to generate the static magnetic field. These devices typically operate at 1 MHz corresponding to a magnetic field in the region of investigation of 0.0235T. Needless to say, this requires the use of permanent magnets with a strong magnetic field as part of the logging instrument.

For example, U.S. Pat. No. 4,350,955 to Jackson et al discloses a pair of permanent magnets arranged axially within the borehole so their fields oppose, producing a region near the plane perpendicular to the axis, midway between the sources, where the radial component of the field goes through a maximum. Near the maximum, the field is homogeneous over a toroidal zone centered around the borehole. U.S. Pat. No. 4,717,877 to Taicher et al teaches the use of elongated cylindrical permanent magnets in which the poles are on opposite curved faces of the magnet. The static field from such a magnet is like that of a dipole centered on the geometric axis of the elongated magnets and provides a region cf examination that is elongated parallel to the borehole axis. The RF coil in the Taicher device is also a dipole antenna with its center coincident with the geometric axis of the magnet, thereby providing orthogonality of the static and magnetic field over a full 360° azimuth around the borehole. U.S. Pat. No. 6,023,164 to Prammer discloses a variation of the Taicher patent in which the tool is operated eccentrically within the borehole. In the Prammer device, NMR logging probe is provided with a sleeve having a semi-circular RF shield covering one of the poles of the magnet: the shield blocks signals from one side of the probe.

These, and others too numerous to mention, have been used for wireline logging wherein the logging tool is conveyed on a wireline into a borehole, as well as Measurement-While-Drilling (MWD) operations where the logging tool forms part of the drilling assembly. All of these tools typically have a region of investigation no more than a few centimeters into the formation and a few millimeters in thickness. Repeatability of the observations requires that the static magnetic field be predictable to a high level of accuracy. An unappreciated problem in NMR logging of earth formations using strong permanent magnets is that the static magnetic field in the subsurface may not correspond to that expected on the basis of the design of the magnet. This is due to the fact the logging instruments, whether on a wireline or as part of an MWD apparatus, have to pass through several hundreds or thousands of meters of casing that is used to line boreholes. To understand the consequences of this, a brief review of the process of drilling wells is needed.

In the drilling of oil and gas wells, drill bits and other equipment are attached to a drill string for boring a hole into the earth. Typically, a drill string may comprise a long string of many connected sections of drill pipe which extend from the earth's surface down into the wellbore or hole being formed by a drill bit connected at the bottom end of the drill string. As the wellbore penetrates more deeply into the earth, it becomes increasingly desirable to install casing in the wellbore, running down from the surface.

Casing is placed in the wellbore for one of two reasons. The first may be to prevent the wall of the wellbore from caving in during drilling and to prevent seepage of fluids from the surrounding strata into the wellbore. Casing is absolutely essential when drilling through an overpressured section (with an abnormally high fluid pressure requiring heavy drilling muds) into a normally pressured or underpressured section below: in such situations, casing is set after drilling through the overpressured formation and the mud weight is reduced. A second reason may be to prevent damage to the reservoir rocks by the drilling mud in the borehole forcing its way into the formation. Even in normal drilling, it is common to set casing of several different sizes in the borehole.

During rotary drilling operations drill strings are subjected to shock, abrasion and frictional forces which are exerted on the drill string whenever the drill string comes in contact with the walls of the wellbore or casing. Both the drillstring and the casing are usually made of steel, a ferromagnetic material, so that the abrasion forces will result in large quantities of ferromagnetic debris within the casing. There are numerous methods and devices for reducing the abrasion. None of them can be completely effective. Circulating drilling mud during drilling is quite effective in bringing cuttings from the formation to the surface but is not effective in completely flushing the more dense metallic debris out of the borehole.

As a result of this, when an NMR logging tool, whether on a wireline or as part of an MWD apparatus, is conveyed into a borehole through casing, much of the magnetic debris within the casing will attach to the tool. This can distort the static magnetic field produced by the permanent magnets in an unpredictable manner. In addition, since the RF pulses are produced by transmitter coils on the logging tool, the RF field is also distorted. Compounding the problem is the fact that the spin-echo signals also have to pass through this debris. U.S. Pat. No. 5,451,873 to Freedman et al. teaches a method of calibrating an NMR tool to account for the accumulation of magnetic debris on the tool. For a so-called "saddle point" tool used in Freedman, one effect of the debris is to change the static field (and hence the Larmor frequency) in the region of investigation. Freedman makes a one-time adjustment to the tool frequency prior to using the tool. The frequency shift is not necessary for gradient tools since for a fixed frequency, the volume of investigation changes. A continuing problem remains: how to compensate for time varying effects of the debris.

In addition to the signal distortion, there is also the practical problem of conveying a strongly magnetized logging tool several meters long through a ferromagnetic casing. This problem is exacerbated in deviated or horizontal boreholes.

SUMMARY OF THE INVENTION

In one embodiment, the present invention is a method for nuclear magnetic resonance (NMR) sensing of earth formations. An electromagnet on a logging tool is used to induce a static magnetic field for polarization of nuclei within a region of the earth formations. A radio frequency pulse is used to tip the magnetic spins of the nuclei. A receiver is used to measure either the free induction decay or spin echo signals (using a CPMG pulse sequence) from the precessing nuclei. The wait time between the activation of the electromagnet and the initial RF pulse is related to a $T_1$ of the formations. When the static magnetic field strength is 10–100 times that of the earth's field, it is possible to obtain low resolution estimates of properties of large volumes of earth formation. The logging tool may be conveyed into the earth on a wireline or on a drilling tubular.

In an alternate embodiment of the invention, a time varying static field is produced using an electromagnet. The transmitter and the receiver operate at different frequencies. This reduces the ringing signals in the receiver and, after calibration, provides a measurement of bulk composition Another embodiment of the invention may be used for estimating fat composition of a human body. A prior art MRI device is operated in accordance with a method of present invention to provide a low intensity static magnetic field, making it possible to obtain low cost body fat and lean measurements.

DETAILED DESCRIPTION OF THE INVENTION

Figure 1:
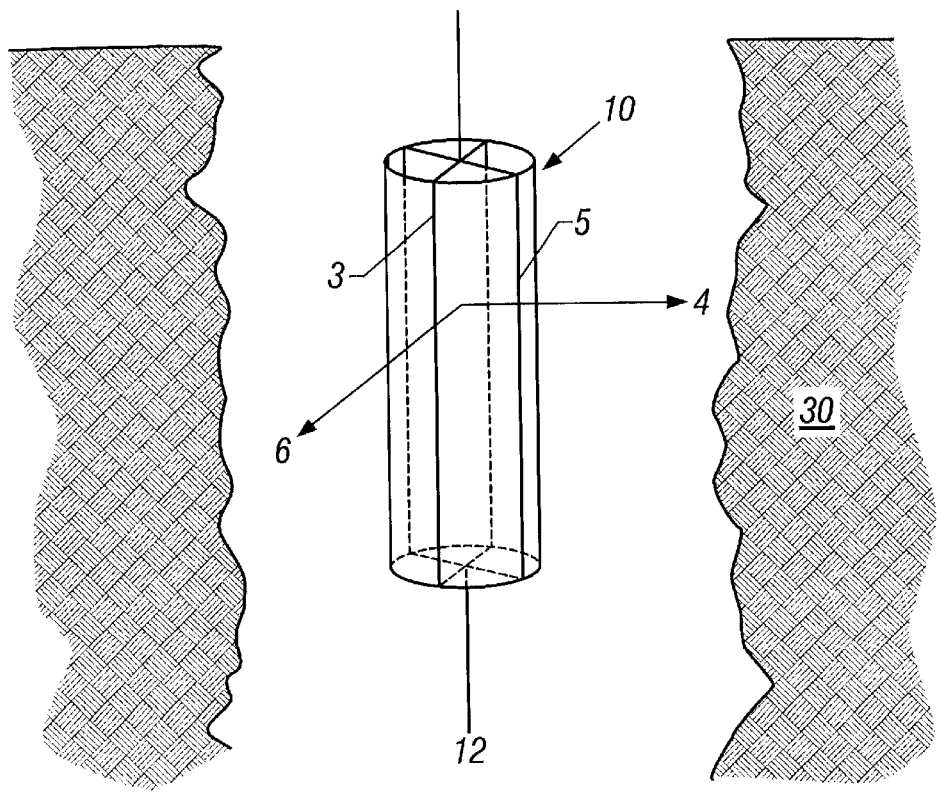
FIG. 1 is a schematic illustration of an NMR tool of the present invention deployed in a borehole.

Referring now to FIG. 1, there is shown an NMR well logging tool 10 conveyed in a borehole 20 within earth formations 30. For exemplary purposes, the tool is shown conveyed by a wireline 40. Surface equipment shown at 50 can be of a conventional type and includes a processor that communicates with the downhole equipment. The deployment on a wireline is for illustrative purposes only and the present invention may also be used in Measurement-while-Drilling (MWD) and Logging while tripping (LWT) environments using known prior art configurations including drilling tubulars such as a drillstring or coiled tubing.

Figure 2:
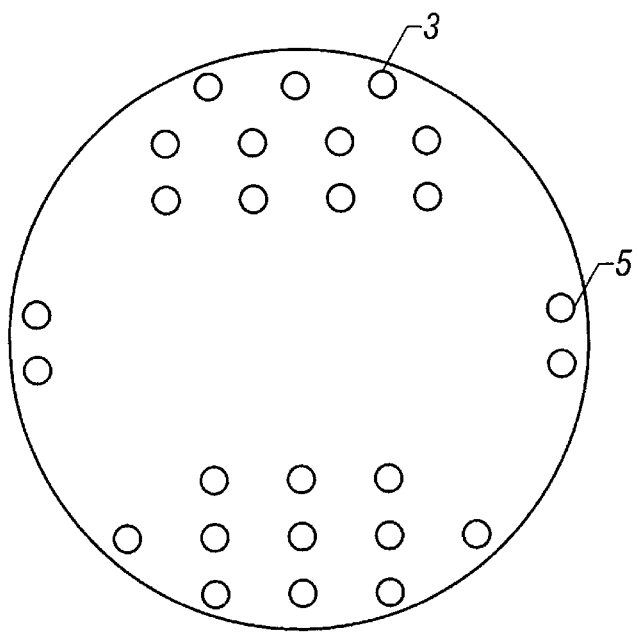
FIG. 2 is a schematic illustration of a cross-section of an embodiment of a logging device of the present invention.

As shown in FIG. 1, the tool 10 has a pair of coils, a polarizing coil 3 that forms an electromagnet and an excitation coil 5 wound on a non-conductive core (not shown). In a preferred embodiment of the invention, an axis 4 of the coil 3, referred to as the polarizing coil, is substantially perpendicular to a longitudinal axis 12 of the borehole and an axis 6 of the coil 5, referred to as the excitation coil, is substantially perpendicular to the longitudinal axis of the borehole 12 and to the axis 4 of the polarizing coil 3. FIG. 2 schematically illustrates a cross-section of an embodiment of a logging device of the present invention. The polarizing coil 3 is preferably consists of multiple winding, whereas the excitation coil 5 preferably consists of one or few winding only. This is shown in FIG. 2.

When an electrical current is passed through the polarizing coil 3, this produces a static magnetic field in the earth formation 30 in the vicinity of the tool that is substantially perpendicular to the borehole axis 12. In one mode of operation, the current in the polarizing coil is kept on for a time equal to a few times the largest $T_1$ value of fluids in the earth formation. Typically, the duration of the polarizing pulse is several seconds. As a result of this polarizing pulse, nuclear spins in the earth formation 30 will become re-oriented substantially parallel to the polarizing field and substantially perpendicular to the borehole axis 12.

The NMR well logging tool 10 further includes the previously described excitation coil 5, (further referred to as a transmitter, receiver or transceiver coil) which can comprise one or more coil windings. Radio Frequency (RF) alternating current passing through the coil 5 generates an RF magnetic field in the earth formation 30 substantially perpendicular to the static magnetic field. The free precession of the nuclear magnetic moments around the static magnetic field direction induce an RF signal in the receiver antenna 5. Such a magnetic field arrangement is conventional for NMR experiments. The RF magnetic field may be modulated by a modulating signal that comprises at least one pulse. When a single pulse with a 90° tipping angle is used and the duration of the polarizing pulse is around $T_1$ (few milliseconds to few seconds), the amplitude of the signal in the receiver antenna is indicative of $T_1$. Alternatively, the at least one pulse may be a sequence of pulses such as a CPMG sequence or a modified CPMG sequence as taught in U.S. Pat. No. 6,163,153 to Reiderman, the contents of which are incorporated herein by reference. Excitation coil 5 is preferably elongated along the longitudinal axis 12 of the borehole and is several times longer than diameter of the borehole 10. In this case this coil generate a substantially two-dimensional magnetic field within the formation of interest. Such a field is perpendicular to the longitudinal axis 12 at any point within the formation of interest.

Figure 3:
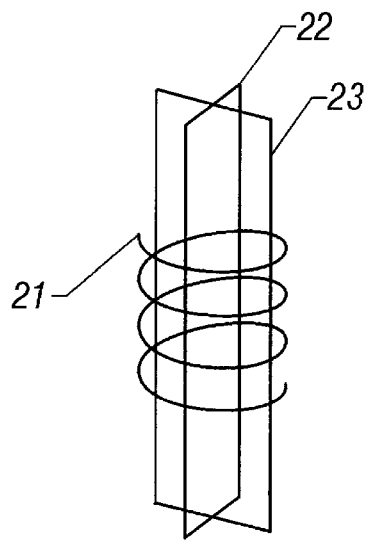
FIG. 3 shows an alternate embodiment of the present invention including an arrangement of the electromagnet coil, transceiver coil and additional receiver coil for use in logging of wellbores.

In an alternate embodiment of the invention shown in FIG. 3, a polarizing coil 21 in a form of a solenoid electromagnet produces a static magnetic field in the earth formation 30 in the vicinity of the tool that is substantially parallel to the borehole axis 12. Additionally, instead of a single transceiver coil 5, a pair of orthogonal coils 22 and 23 are used with coil axes orthogonal to each other and to the borehole axis 12. Alternatively, the device of FIG. 3 may be used so that coils 22 and 23 are used both as a transmitter and a receiver. One possibility is to use the coil 23 only as a receiver. The second possibility is to use the coil 22 also as receiver to detect an additional component of the spin-echo signals, which is orthogonal to the signal component received in the first receiving coil. The orthogonality of the two coil axes to the axis of the polarizing coil 21 substantially reduces the current induced in the transmitter/receiver coil by the termination of the polarizing pulse. When an electrical current is passed through the polarizing coil 21, this produces a static magnetic field in the earth formation 30 in the vicinity of the tool that is substantially parallel to the borehole axis 12.

The tool of FIGS. 1–3 may be easily passed through casing without accumulation of ferromagnetic debris or sticking caused by magnetic attraction to well casing, as there is no permanent magnet on the tool. Low magnetic fields (0.6–6 mT, i.e., 10–100 times the earth's field) are easy to generate by DC currents. In the logging environment and in the case of whole body composition analysis the region of investigation is large so that the SNR is expected to be adequate with measurement times of a few seconds (i.e., with a few repetitions of the CPMG sequence). For that short time a pulse of DC current (low average power requirements) may generate the static magnetic field. Optionally, a capacitor may be used on the logging tool with the capacitor discharge providing the static field. Yet another option is to generate a pulse of static magnetic field only during one sequence.

In an alternate embodiment of the invention, the excitation coil is pulsed after partial polarization of the nuclear spins. The partial polarization time (time between beginning of polarizing pulse and beginning of excitation RF pulse) may range from 0.1 to 5 times the largest value of $T_1$ in the formation. By making such measurements with several different partial polarization times, information may be obtained regarding the $T_1$ distribution of the formation.

Figure 4:
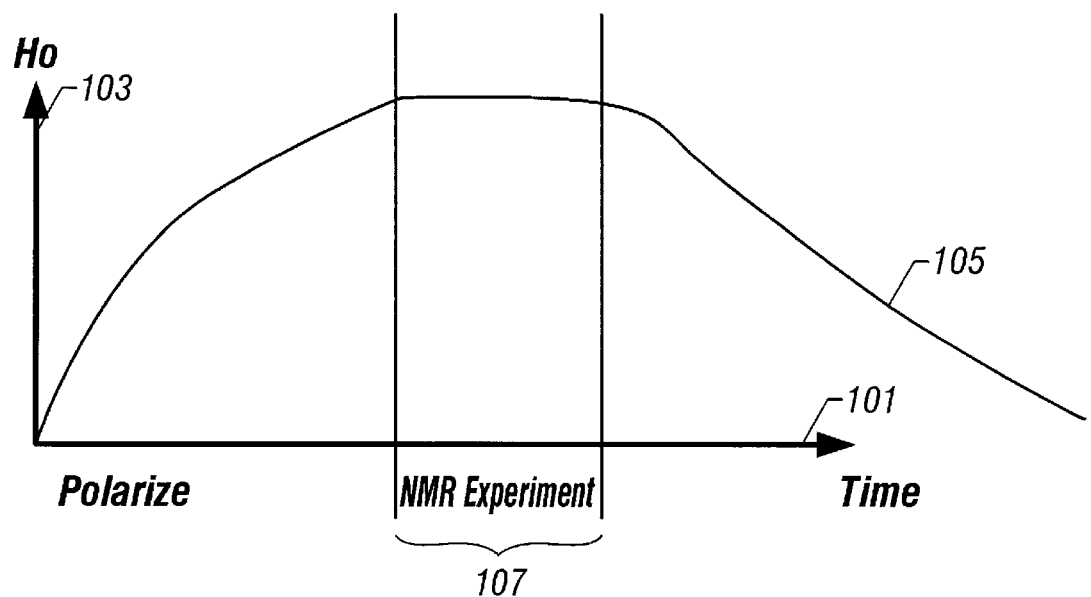
FIG. 4 is a schematic illustration of a conventional NMR measurement method.

Conventional NMR measurements are made by applying a predetermined static magnetic field to the region under investigation to partially or fully polarize the nuclear spins. Following this, a RF magnetic field is applied to determine the decay characteristics of nuclear spins. The NMR experiment may involve measurement of free induction decay (FID) or it may involve spin-echo measurements. For example, in a commonly used method of spin-echo measurements, the RF magnetic field comprises a tipping pulse that tips the nuclear spins by 90° and starting a precession of the spins. A series of refocusing pulses is applied and pulse echo signals are measured using a receiver coil. The transmitter and receiver coils may be the same. A conventional NMR method is illustrated in FIG. 4 where the abscissa 101 is time, the ordinate 103 is the magnetic intensity shown by 105 and the measurements are made during a time duration 107. Regardless of whether FID or spin-echo measurements are made, there are stringent requirements on the stability of the magnetic field (typically 1%) and its gradient. Additionally, if the same antenna is used for transmitting and receiving the RF signals, switching transients may be present. This, and ringing produced by the initial tipping pulse causes problems in making accurate measurements of signal amplitudes. Many of these problems are avoided in the novel procedure described next.

Figure 5:
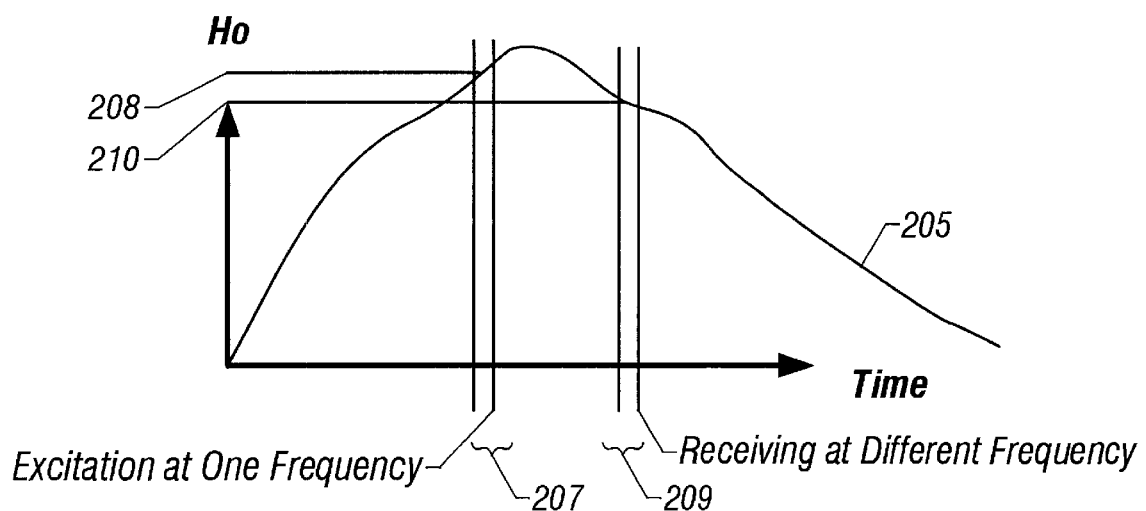
FIG. 5 is a schematic illustration of a method of making NMR measurements in a time-varying static magnetic field.

FIG. 5 illustrates the methodology of the present invention. A slowly varying magnetic field is produced by passing a current through a polarizing coil, the field intensity as a function of time being shown by 205. The RF field is applied at one time interval 207 with a RF frequency corresponding to magnetic field intensity 208. The static magnetic field produced by the polarizing coil may then increase to some maximum value and then starts decreasing. The measurements are made during a time interval such as 209 when the field intensity 210 (and the corresponding precession frequency) are different from those of the tipping pulse. The advantage of this is obvious since this eliminates the ringing. In addition, stability requirements on the static field are greatly reduced, the main requirement being that the measurements be repeatable. There is no requirement that the nuclear spins be fully polarized, or even that the extent of the partial polarization be known. Furthermore, there is no requirement that the RF pulse tip the nuclear spins by 90°, the only requirement being that of repeatability. Different materials will respond differently and can be calibrated accordingly. For example, water, oil, and gas may have different responses. Once a calibration is performed, the pulsed polarization method may be used for logging of earth formations. This method may be used with the coil configurations described above with reference to FIGS. 1–3.

Those versed in the art would recognize that the temporal variation of the static field such as that shown in FIG. 5 can be easily obtained by discharge of a capacitor. For a given coil configuration, the requirements of stability are easily met.

Figure 6:
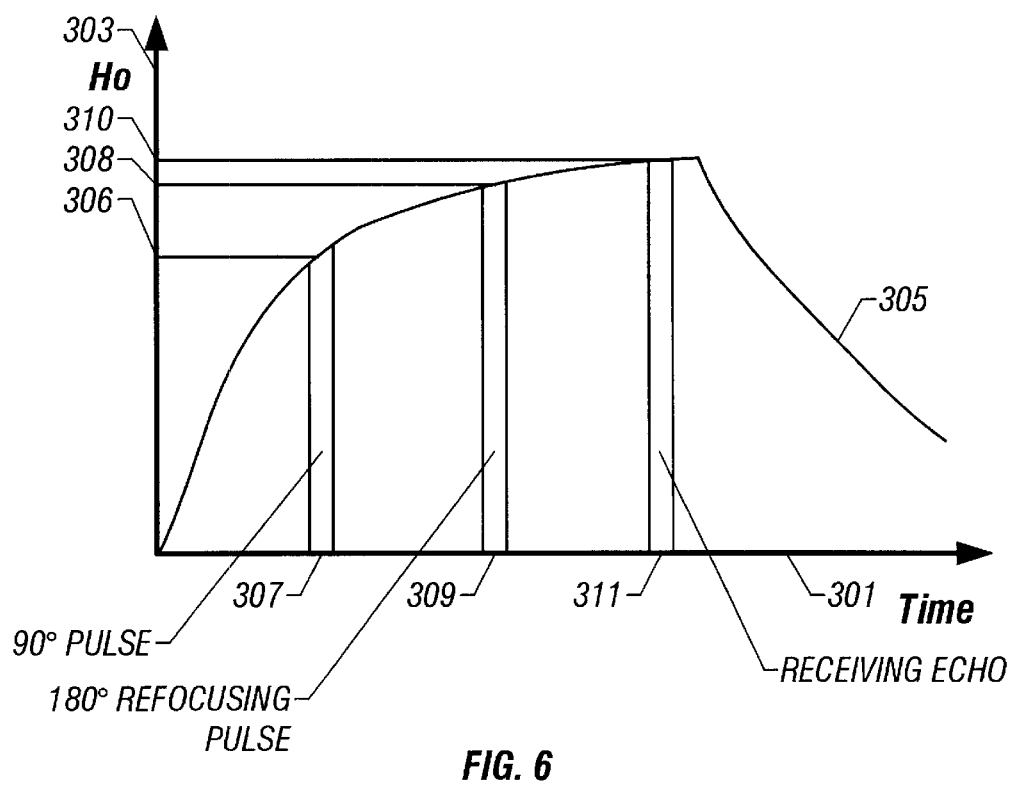
FIG. 6 is an illustration of the pulse sequences for a method of making NMR measurements in a time-varying static magnetic field.

When static magnetic field spatial distribution at any moment in time is homogenous, it is possible to make FID measurements. The condition of homogeneity is applicable for some cases of whole body composition determination. However, in the logging environment, static magnetic field gradients exist and therefore, a spin-echo measurement have to be implemented. FIG. 6 shows the methodology of performing a spin-echo experiment with a time-varying static magnetic field. The field intensity of the static magnetic field as a function of time being shown by 305. A first pulse of RF magnetic field is applied at a first time interval 307 with a RF frequency corresponding to magnetic field intensity 306. The RF field intensity and the duration of this pulse are set to be such, that the nuclear spins are tipped by approximately 90°. The static magnetic field produced by the polarizing coil may then changed to a higher or lower level. FIG. 6 shows the static field being increased. A second pulse of RF field is applied at a second time interval 309 with a RF frequency corresponding to static magnetic field intensity 308. The RF magnetic field intensity and the duration of this pulse are set so that the nuclear spins are tipped by approximately 180°. Since the static magnetic field is inhomogeneous, the timing of the 90° and the 180° pulses is important. The measurements are made during a time interval such as 311 when the field intensity 310 (and the corresponding precession frequency) are different from those of the tipping and the refocusing pulses. Proper timing of the tipping and refocusing pulses is important due to the field variation.

At each point in space the static magnetic field is related to the electrical current which generate the field. For the NMR well logging equipment shown in FIGS. 1–3, the regions of equal static magnetic field form cylindrical shells. Therefore, if the first pulse of RF magnetic field is applied at time interval different from time interval 307 with a RF frequency corresponding to magnetic field intensity 306, nuclear spins at different shell will be tipped. Timing of the 90° and the 180° can be easily calibrated by adjusting received signal to maximum amplitude.

The method has been described above using a single refocusing pulse followed by the reception of a single echo. The method may be generalized to include a plurality of refocusing pulses with a varying time interval therebetween and receiving a corresponding set of echos. Additionally, measurements made at different depths in a borehole may be deconvolved using known signal processing techniques to improve the resolution of the estimated properties of the formation.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method for nuclear magnetic resonance (NMR) sensing of earth formations comprising:
   (a) using an electromagnet on a logging tool in a borehole within the earth formations for inducing a time varying magnetic field for polarization of nuclei within a region of the earth formations, said electromagnet being used between an activation time and a deactivation time;
   (b) generating during a first time interval a first radio frequency (RF) magnetic field having a first frequency for causing precession of said nuclei, said first frequency being related to a first intensity of the static field induced during said first time interval;
   (c) generating during a second time interval later than the first time interval a second RF magnetic field having a second frequency for refocusing said precessing nuclei, said second frequency being related to a second intensity of the static field induced during the second time interval; and
   (d) receiving at a third time interval after the second time interval an NMR signal from said nuclei at a third frequency, wherein said third frequency is related to a third intensity of the static field induced during said third time interval, wherein said first, second and third frequencies comprise at least two different frequencies.

2. The method of claim 1 wherein said first time interval is delayed relative to said activation time by a wait time related to a longitudinal relaxation time $T_1$ of material within said region.

3. The method of claim 1 wherein said wait time is at least equal to $T_1$.

4. The method of claim 1 wherein said first RF magnetic field has a tipping angle substantially equal to 90° and the second RF magnetic field has a tipping angle between 90° and 180°.

5. The method of claim 2 further comprising repeating (a)–(c) at least once and acquiring NMR signals with a plurality of wait times.

6. The method of claim 1 wherein at least one of the first, second and third intensities is between 0.6 and 6.0 mT.

7. The method of claim 1 wherein said electromagnet comprises at least one coil with windings in a plane substantially parallel to a longitudinal axis of said borehole.

8. The method of claim 7 wherein generating said RF field further comprises using a coil on the logging tool with windings in a plane substantially parallel to said longitudinal axis and substantially parallel to a total dipole moment of said electromagnet.

9. The method of claim 1 wherein said electromagnet comprises at least one coil wound with windings in a plane substantially perpendicular to a longitudinal axis of said borehole.

10. The method of claim 9 wherein generating said first and second RF fields further comprises using a coil on the logging tool with windings in a plane substantially parallel to said longitudinal axis.

11. The method of claim 1 wherein said logging tool is conveyed into the borehole in one of (i) a wireline, (ii) a drillstring, and, (iii) coiled tubing.

12. The method of claim 1 wherein at least one of the first, second and third frequencies is different from one of the other frequencies.

13. In a method of nuclear magnetic resonance (NMR) sensing of earth formations, using, in a borehole containing a ferromagnetic casing and ferromagnetic debris, a logging tool designed to have (i) a permanent magnet for generating a static magnetic field in the earth formations, and (ii) at least one antenna for generating a modulated radio frequency (REF) magnetic field in the earth formations and receiving NMR signals therefrom, an improvement comprising:
    (a) replacing said permanent magnet by an electromagnet operated between an activation time and deactivation time for inducing the static magnetic field; and
    (b) initiating at least one pulse for modulating said RF field at a start time delayed relative to said activation time by a wait time related to a longitudinal relaxation time $T_1$ of material within said region.

14. The method of claim 13 wherein said wait time is at least equal to $T_1$.

15. The method of claim 13 wherein the at least one pulse further comprises a plurality of pulses forming one of: (i) a CPMG sequence, and, (ii) a modified CPMG sequence.

16. The method of claim 13 further comprising repeating (b) at least once and acquiring NMR signals with a plurality of wait times.

17. The method of claim 13 wherein said static magnetic field has a field strength between 0.6 and 6.0 mT.

18. The method of claim 13 wherein said electromagnet comprises at least one coil with windings in a plane substantially parallel to a longitudinal axis of said borehole.

19. The method of claim 18 wherein said at least one antenna further comprises a coil on the logging tool with windings in a plane substantially parallel to said longitudinal axis and substantially parallel to a total dipole moment of said electromagnet.

20. The method of claim 13 wherein said electromagnet comprises at least one coil wound with windings in a plane substantially perpendicular to a longitudinal axis of said borehole.

21. The method of claim 20 wherein said at least one antenna further comprises a coil on the logging tool with windings in a plane substantially parallel to said longitudinal axis.

22. A method for nuclear magnetic resonance (NMR) sensing comprising:
    (a) using a magnet for inducing a static magnetic field for polarization of spins of nuclei in materials to be analyzed, said static magnetic field having a time-varying field intensity;
    (b) generating a radio frequency (RF) magnetic field having a first frequency for causing precession of spins of said nuclei, wherein said first frequency is generated during a first time interval and is related to a first intensity of the static field induced during said first time interval; and
    (c) receiving at a second time interval delayed relative to the first time interval a NMR signal from said precessing nuclei at a second frequency, wherein said second frequency is related to a second intensity of the static field induced during said second time interval, wherein said second frequency is different from said first frequency.

23. The method of claim 22 further comprising generating a third RF magnetic field at a third time interval between the first and second time intervals for refocusing of said precessing spins.

24. The method of claim 22 wherein said magnet comprises an electromagnet.

25. The method of claim 22 wherein said materials to be analyzed comprises an earth formation, the method further comprising conveying said electromagnet into a borehole in the earth formation.

26. The method of claim 25 further comprising calibrating said NMR signal and determining a composition of a fluid in the earth formation.

27. The method of claim 22 wherein using said electromagnet further comprises discharging a capacitor through the electromagnet.

28. A well logging apparatus for nuclear magnetic resonance (NMR) sensing of earth formations comprising:
    (a) an electromagnet on a logging tool in a borehole within the earth formations for inducing a time varying static magnetic field for polarization of nuclei within a region of the earth formations, said electromagnet being used between an activation time and a deactivation time;
    (b) a transmitter for inducing:
        (A) during a first time interval a first radio frequency (RF) magnetic field having a first frequency for causing precession of said nuclei, said first frequency being related to a first intensity of the static field induced during said first time interval; and
        (B) during a second time interval later than the first time interval a second RF magnetic field having a second frequency for refocusing said precessing nuclei, said second frequency being related to a second intensity of the static field induced during the second time interval; and
    (c) a receiver for receiving at a third time interval after the second time interval an NMR signal from said nuclei at a third frequency, wherein said third frequency is related to a third intensity of the static field induced during said third time interval, wherein said first, second and third frequencies comprise at least two different frequencies.

29. The apparatus of claim 28 wherein said first RF magnetic field has a tipping angle substantially equal to 90° and the second RF magnetic field has a tipping angle between 90° and 180°.

30. The apparatus of claim 28 wherein said pulse sequence comprises one of (i) a CPMG pulse sequence, and, (ii) a modified CPMG pulse sequence.

31. The apparatus of claim 28 wherein at least one of the first, second and third frequencies is different from at least one of the other two frequencies.

32. The apparatus of claim 28 wherein at least one of the first, second and third intensities is between 0.6 and 6.0 mT.

33. The apparatus of claim 28 wherein said electromagnet further comprises at least one coil with windings in a plane substantially parallel to a longitudinal axis of said borehole.

34. The apparatus of claim 33 wherein said transmitter further comprises at least one coil with windings in a plane substantially parallel to a longitudinal axis of said borehole.

35. The apparatus of claim 28 wherein said electromagnet further comprises at least one coil wound with windings in a plane substantially perpendicular to a longitudinal axis of said borehole.

36. The apparatus of claim 35 wherein said transmitter further comprises a coil on the logging tool with windings in a plane substantially parallel to said longitudinal axis.

37. The apparatus of claim 28 further comprising a capacitor operatively coupled to the electromagnet, said electromagnet producing said time varying static field upon discharge of the capacitor therethrough.

* * * * *

UNITED STATES PATENT AND TRADEMARK OFFICE
CERTIFICATE OF CORRECTION

PATENT NO.    : 6,559,640 B2
DATED         : May 6, 2003
INVENTOR(S)   : Gersh Zvi Taicher It is certified that error appears in the above-identified patent and that said Letters Patent is hereby corrected as shown below:

Column 9,
Line 13, please delete "(REF)" and insert -- (RF) --.
Line 26, please delete "repeatirg" and insert -- repeating --.

Signed and Sealed this

Eighth Day of July, 2003

JAMES E. ROGAN
*Director of the United States Patent and Trademark Office*